(No Model.)
J. J. WADE.
SOIL OR SEWER PIPE FLUSHING DEVICE.
No. 406,977. Patented July 16, 1889.
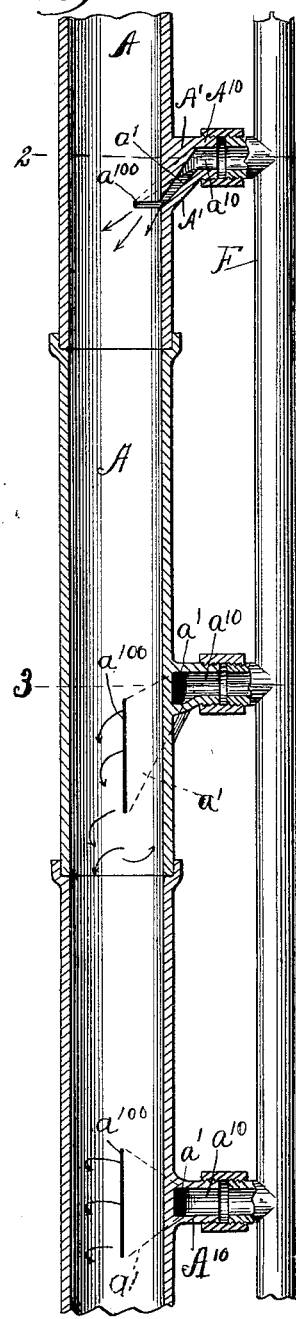
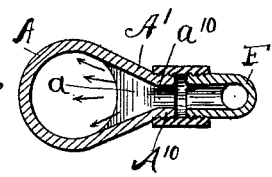
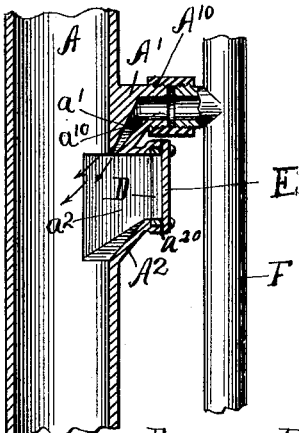
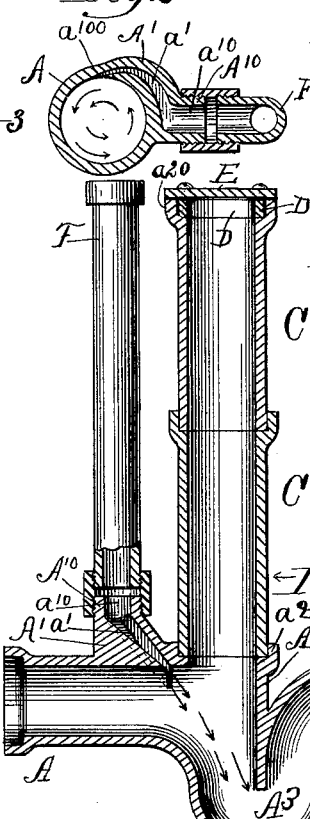
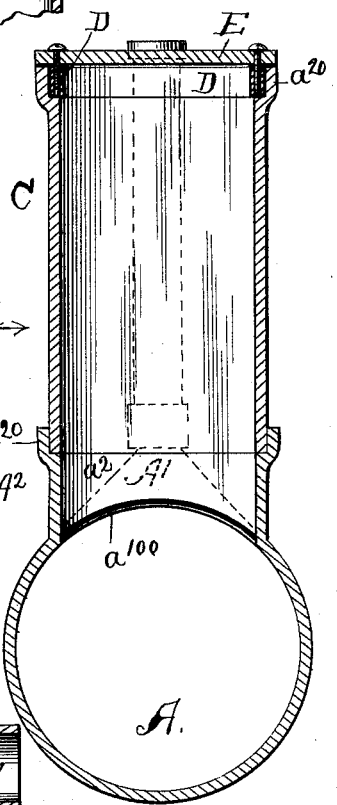

UNITED STATES PATENT OFFICE.

JAMES J. WADE, OF CHICAGO, ILLINOIS.

SOIL OR SEWER PIPE FLUSHING DEVICE.

SPECIFICATION forming part of Letters Patent No. 406,977, dated July 16, 1889.

Application filed November 12, 1888. Serial No. 290,515. (No model.)

*To all whom it may concern:*

Be it known that I, JAMES J. WADE, a citizen of the United States, residing at Chicago, county of Cook, and State of Illinois, have invented certain new and useful Improvements in Soil or Sewer Pipe Flushing Devices, which are fully set forth in the following specification, reference being had to the accompanying drawings, forming a part thereof.

This invention is designed as an improvement upon the fitting for drain, soil, and waste pipes shown in Letters Patent No. 304,379, granted to me, dated September 2, 1884.

In the drawings, Figure 1 is a central vertical sectional view of a soil and drain pipe made up of sections which each contain my invention. Fig. 2 is a section at the line 2 2 on Fig. 1. Fig. 3 is a section at the line 3 3 on Fig. 1. Fig. 4 is a transverse section of a horizontal pipe supposed to be laid underground and having a thimble extending from the man-hole or hand-hole to the surface and provided with a cover. Fig. 5 is a longitudinal central section of a single joint of drain-pipe, showing my invention in the same form as in Fig. 2, with the addition of a hand-hole immediately below the flushing-jet, and showing slight variation from the form shown in Fig. 2 on account of that addition. Fig. 6 is a longitudinal section of a horizontal pipe containing a trap and having my invention applied adjacent to the trap to flush the same.

I will describe first the form of the flushing device, as shown in Fig. 2, and the upper joint of Fig. 1.

A is the soil-pipe, which is formed with a swell or boss $A'$ upon the exterior, said boss terminating in a nipple $A^{10}$, for the purpose of attaching a water-pipe, (represented by F.) The boss $A'$ widens from the nipple $A^{10}$ and tapers down to the surface of the pipe A, so that where it merges in that surface it extends around from one-third to one-half of the circumference of the pipe. Within this boss is the cavity $a'$, which opens into the soil-pipe in a narrow orifice $a^{100}$, which extends about one-third the way round the soil-pipe. From this orifice the cavity $a'$ widens in the direction of the length of the pipe A and contracts in direction transverse to the pipe until it merges in the round aperture $a^{10}$ through the nipple $A^{10}$, thus making a fan-shaped jet-orifice, through which water may be discharged into the soil-pipe in the direction shown by the arrows and act as a scouring flushing-jet.

The form illustrated in the second joint of the pipe shown in Figs. 1 and 3 differs from that above described in that the flushing-jet orifice extends longitudinally with respect to the pipe A, instead of transversely, and the cavity extends from the round opening $a^{10}$ spirally around the pipe, and at the point of communication through the orifice into the pipe is substantially tangent to the inner surface of the pipe, so that it discharges a jet which will follow the inner surface of the pipe spirally so long as the original impetus with which it is injected continues, so that it will very thoroughly scour the pipe. The form shown in the lower joint of Fig. 1 is like that in the middle joint in the same figure, except that the jet-orifice lacks the spiral characteristic of the middle joint.

It will be understood that any one or all of these forms may be employed in the same run of pipe, or all the joints may have the same form, and any number of such joints, with water-connections, may be interposed in the soil-pipe, or the entire soil-pipe may be made up of such joints. I prefer also to provide immediately below the boss which contains the flushing-jet cavity and orifice a hand-hole $a^2$, which I make through the rectangular boss $A^2$, formed on the pipe A. When this construction is employed, it is convenient to make the wall of the boss $A^2$ which is next the boss $A'$ such that the plane of the inner surface of that wall cuts the flushing-jet $a'$ just before the latter emerges into the soil-pipe, thus causing the orifice $a^{10}$ to appear in the said proximate wall of the hand-hole instead of the inner wall of the pipe. This peculiarity appears in the section Fig. 5, wherein such hand-hole is illustrated. For the hand-hole I provide a cover E, which is secured to the boss $A^2$ in a manner which is better illustrated, because on a larger scale, in Fig. 4, wherein the pipe A is a horizontal sewer-pipe. The hand-hole or man-hole is formed, as in Fig. 4, through the boss $A^2$. Said boss terminates upwardly in the flange or hub $a^{20}$, and a thimble or additional joint of pipe C is fitted and calked in said flange in the usual manner of making such combinations with sewer-pipes. A sufficient number of such additional joints will be used to extend to the surface of the ground, being successively united to each other in the manner in which the one shown is united to the boss A².

Into the upper end, which contains the hub of the topmost of such thimbles, I fit and calk tightly the ring or short thimble D, whose height is only equal to that of the flange C', so that when it is fitted therein the upper edge of the thimble D is flush with the upper edge of the flange C'. The cover E, which is a simple flat disk, is then secured directly to the thimble D by means of screws e, passing through the plate and into the thimble, suitable packing or calking material being interposed between the upper surface of the cover-plate E and the upper edges of the flange C' and the thimble D. Precisely the same method is employed in securing the cover upon the hand-hole illustrated in Fig. 4, and the same reference-letters are applied to the corresponding parts. In order to prevent the lodgment of soil upon the ledge necessarily formed in the soil-pipe by the extension which constitutes the boss A², I make the lower or farthermost side of said boss sloping, as illustrated in Fig. 4, and the flushing-jet will scour this as well as the remainder of the pipe.

A water-pipe F being connected to the nipple $A^{10}$ by any suitable coupling, water is injected in a fan-shaped jet into the soil or sewer pipe and flushing the same. When a horizontal underground pipe is provided with my invention, the nipple $A^{10}$ is connected with an extension-piece F', extending up to the surface of the ground and corresponding to the thimble C.

This device may be applied to all familiar pipe-fittings. In Fig. 6 it is shown applied to a simple trap A³.

I claim—

1. A soil, drain, or sewer pipe having in the wall thereof a cavity communicating with said pipe through a long narrow orifice, said cavity emerging at the outer surface of the soil-pipe, in combination with a water-pipe communicating with said cavity at its outer end, substantially as set forth.

2. A soil, drain, or sewer pipe having in the wall thereof a cavity communicating with the interior of the soil-pipe and opening exteriorly through the wall of said pipe, said cavity having the orifice through which it opens into the soil-pipe long and narrow, and said cavity diminishing in respect to the longer dimension and increasing in respect to the narrower dimension of said orifice as it extends outward, in combination with a water-pipe communicating with the orifice at its outer end, substantially as set forth.

3. A soil, drain, or sewer pipe having in the wall thereof a cavity communicating with the interior of the pipe through a long narrow orifice extending longitudinally with respect to said pipe, the direction of said cavity at the point where it emerges through said orifice into the soil-pipe being approximately tangential to the inner surface of said soil-pipe, in combination with a water-pipe communicating with said cavity at its outer end, substantially as set forth.

4. A soil, drain, or sewer pipe having in the wall thereof a cavity which communicates with the interior of said pipe, said cavity extending from said orifice back spirally about the pipe, in combination with a water-pipe communicating with said cavity at its outer end, substantially as set forth.

5. A soil, drain, or sewer pipe having in the wall thereof a cavity which communicates with the interior of the pipe through a long narrow opening, and which has adjacent to such cavity a hand-hole provided with a removable cover, in combination with a water-pipe which communicates with the cavity at its outer end, substantially as set forth.

6. In combination with a soil, drain, or sewer pipe having the boss A² for the purpose of a hand-hole, said boss terminating outwardly in a hub $a^{20}$, the thimble D, equal in height to the interior of the hub, and the cover E, consisting of a flat disk adapted to be secured to the outer edge of the thimble, substantially as set forth.

In testimony whereof I have hereunto set my hand, in the presence of two witnesses, at Chicago, Illinois, this 5th day of November, 1888.

JAMES J. WADE.

Witnesses:
 CHAS. S. BURTON,
 E. F. BURTON.